United States Patent
Nakagawa

(10) Patent No.: US 8,223,273 B2
(45) Date of Patent: Jul. 17, 2012

(54) VIDEO TRANSMISSION APPARATUS AND VIDEO TRANSMISSION METHOD

(75) Inventor: Hideyuki Nakagawa, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1002 days.

(21) Appl. No.: 12/135,558

(22) Filed: Jun. 9, 2008

(65) Prior Publication Data

US 2008/0303956 A1    Dec. 11, 2008

(30) Foreign Application Priority Data

Jun. 11, 2007  (JP) .................... 2007-154487

(51) Int. Cl.
*H04N 5/38* (2006.01)
(52) U.S. Cl. .................. 348/723; 725/143; 370/329
(58) Field of Classification Search .............. 348/723, 348/738, 552, 553; 725/78–85, 131–134, 725/139–142; 370/329, 338
See application file for complete search history.

(56) References Cited

U.S. PATENT DOCUMENTS 7,583,644 B2 * 9/2009 Morioka et al. ............. 370/338
7,860,055 B2 * 12/2010 Hayasaka ................... 370/329

FOREIGN PATENT DOCUMENTS

| JP | 11-355164 | 12/1999 |
| JP | 2001-078180 | 3/2001 |
| JP | 2004-336729 | 11/2004 |
| WO | WO-2006/101801 | 9/2006 |
| WO | WO-2007/037478 | 4/2007 |

OTHER PUBLICATIONS

Japanese Office Action dated Apr. 24, 2012, filed in Japanese counterpart Application No. 2007-154497, 4 pages (with English translation).

* cited by examiner

*Primary Examiner* — Annan Shang
(74) *Attorney, Agent, or Firm* — Patterson & Sheridan, LLP

(57) ABSTRACT

According to one embodiment, a video transmission apparatus includes a detection unit which detects a communication quality level of a wireless communication channel which wirelessly connects a display device and the video transmission apparatus, a start control unit which starts a process of transmitting video data to the display device via the wireless communication channel if the detected communication quality level exceeds a first threshold value and a hot plug detect signal is received in a state in which transmission of the video data to the display device is stopped, and a stop control unit which stops the transmission of the video data to the display device if the detected communication quality level falls below a second threshold value, which is lower than the first threshold value, in a state in which the process of transmitting the video data to the display device is being executed.

12 Claims, 8 Drawing Sheets

# VIDEO TRANSMISSION APPARATUS AND VIDEO TRANSMISSION METHOD

CROSS-REFERENCE TO RELATED APPLICATIONS

This application is based upon and claims the benefit of priority from Japanese Patent Application No. 2007-154487, filed Jun. 11, 2007, the entire contents of which are incorporated herein by reference.

BACKGROUND

1. Field

One embodiment of the invention relates to a video transmission apparatus and a video transmission method, for example, having a function for transmitting video data to a display device by a wireless signal.

2. Description of the Related Art

In recent years, interface standards, such as Digital Visual Interface (DVI) and High-Definition Multimedia Interface (HDMI), have been used as interfaces for transmitting video data. The interfaces, such as DVI and HDMI, are used in order to transmit video data, such as a digital television signal, from a video transmission apparatus, such as a personal computer or a DVD (Digital Versatile Disc) player, to a display device-such as a TV set, a monitor or a projector.

In the interface such as DVI or HDMI, a hot plug detect signal is stipulated. The hot plug detect signal is a signal which indicates that the display device is connected to the video transmission apparatus and that the display device is able to display the video data. The hot plug detect signal is sent from the display device to the video transmission apparatus. Upon receiving the hot plug detect signal, the video transmission apparatus can start transmission of video data to the display device.

Jpn. Pat. Appln. KOKAI Publication No. 2006-203725 discloses an apparatus including an interface according to the HDMI standard. When the hot plug detect signal rises to a High level, this apparatus starts authentication with the display device and outputs an HDMI signal.

In the meantime, the interface standard such as DVI or HDMI, it is presupposed that the video transmission apparatus, which is called "source device", and the display device, which is called "sink device", are connected via a cable. However, since the cable connection restricts places where the video transmission apparatus and the display device are to be disposed, it is difficult to dispose the video transmission apparatus and the display device at arbitrary places.

If the interface, such as DVI or HDMI, is implemented by a wireless scheme, it becomes possible to dispose the video transmission apparatus and the display device at arbitrary places.

In order to wirelessly transmit video data from the video transmission apparatus to the display device, it is necessary to emulate a hot plug detect signal which indicates that the display device can display video data. Wireless communication, however, unlike wired communication, is affected by the peripheral environment and the distance between the video transmission apparatus and the display device. Thus, depending on the wireless connection environment, such a problem arises that the hot plug detect signal from the display device can or cannot be received by the video transmission apparatus, and the enable state and disable state of the hot plug detect signal are repeated. In this case, since the video transmission apparatus repeats the transmission start and transmission stop of the video data, such an unpleasant phenomenon for a user occurs that the screen image of the display device may flicker.

In the case of implementing the interface, such as DVI or HDMI, by a wireless scheme, it is necessary, therefore, to realize a novel function which can prevent flickering of a screen image due to instantaneous variation of the wireless connection environment.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a video transmission apparatus which executes wireless communication with a display device to transmit video data to the display device, comprising: a communication quality detection unit configured to detect a communication quality level of a wireless communication channel which wirelessly connects the display device and the video transmission apparatus; a start control unit configured to start a process of transmitting the video data to the display device via the wireless communication channel if the detected communication quality level exceeds a first threshold value and a hot plug detect signal, which is transmitted from the display device via the wireless communication channel, is received in a state in which transmission of the video data to the display device is stopped, the hot plug detect signal indicating that the display device is able to display the video data; and a stop control unit configured to stop the transmission of the video data to the display device if the detected communication quality level falls below a second threshold value, which is lower than the first threshold value, in a state in which the process of transmitting the video data to the display device is being executed.

Figure 1:
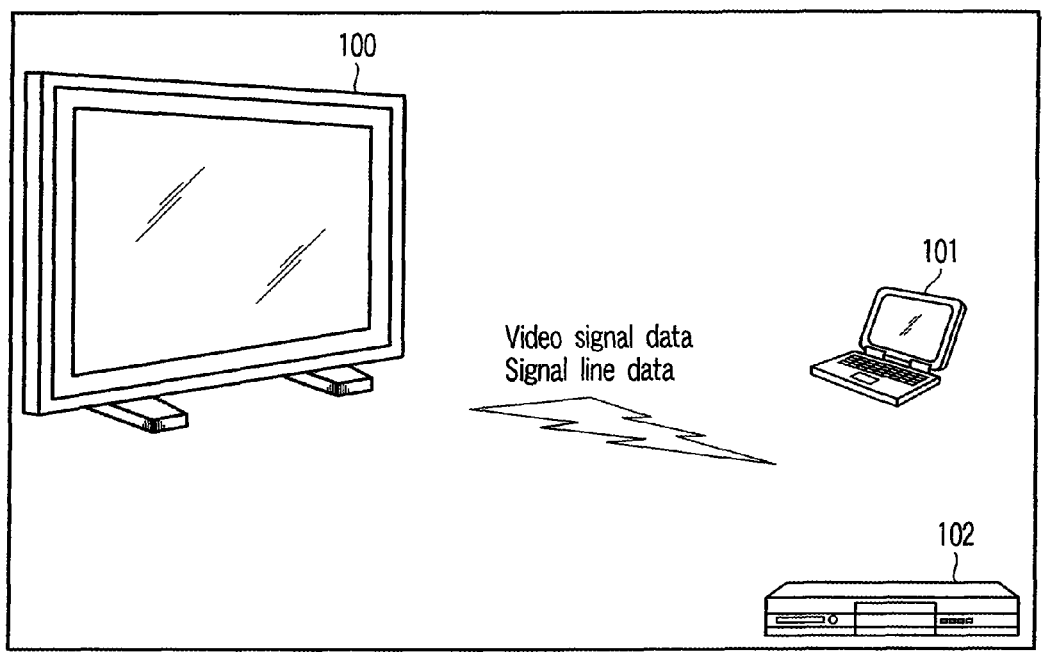
FIG. 1 is an exemplary block diagram showing a structure of a wireless transmission system including a video transmission apparatus according to an embodiment of the invention.

FIG. 1 shows the structure of a video data wireless transmission system including a video transmission apparatus according to an embodiment of the invention. The video transmission apparatus is an apparatus which is capable of wirelessly transmitting video data, and is composed of a personal computer (PC) 101 or a DVD player 102. Each of the PC 101 and DVD player 102 can transmit, by a wireless signal, a video signal as digital data to a display device 100 which is composed of a TV set or a monitor. The performance of a wireless interface between the video transmission apparatus 101 or 102 and the display device 100 is equivalent to the performance of wireless implementation of a DVI or HDMI cable. For example, UWB (Ultra Wideband), which has a higher speed than wireless LAN, is suitable as a wireless communication scheme that is used in this system.

As described above, in cables according to the DVI and HDMI standards, a signal line for a hot plug detect signal is defined. The hot plug detect signal is a signal which indicates that the display device is connected to the video transmission apparatus and that the display device can display video data. The hot plug detect signal is sent from the display device to the video transmission apparatus. In the present video data wireless transmission system, the display device 100 and the video transmission apparatus 101 or 102 are not connected by wire over a cable. It is thus necessary to emulate a hot plug detect signal in order to transmit the hot plug detect signal, by a wireless signal, from the display device 100 to the video transmission apparatus 101 or 102, after wireless connection is established between the display device 100 and the video transmission apparatus 101 or 102.

The wireless communication, unlike wired communication, is affected by the peripheral environment and the distance between the video transmission apparatus and the display device. Thus, depending on the wireless connection environment, such a problem arises that the hot plug detect signal, which is transmitted from the display device 100, can or cannot be received by the video transmission apparatus 101 or 102, and the enable state and disable state of the hot plug detect signal are repeated. With this problem occurring, as described above, the video transmission apparatus 101 or 102 repeats the transmission start and transmission stop of the video data, and such an unpleasant phenomenon for a user occurs that the screen image of the display device 100 may flicker. For example, the wireless connection environment instantaneously greatly varies due to, for instance, the movement of a person who is present between the video transmission apparatus 101 or 102 and the display device 100, and a phenomenon of temporary interruption of the hot plug detect signal occurs over and over again and, as a result, flickering of the screen image occurs.

The video transmission apparatus 101 or 102 of the present embodiment has a function of preventing flickering of a screen image due to instantaneous variation of the wireless connection environment.

Figure 2:
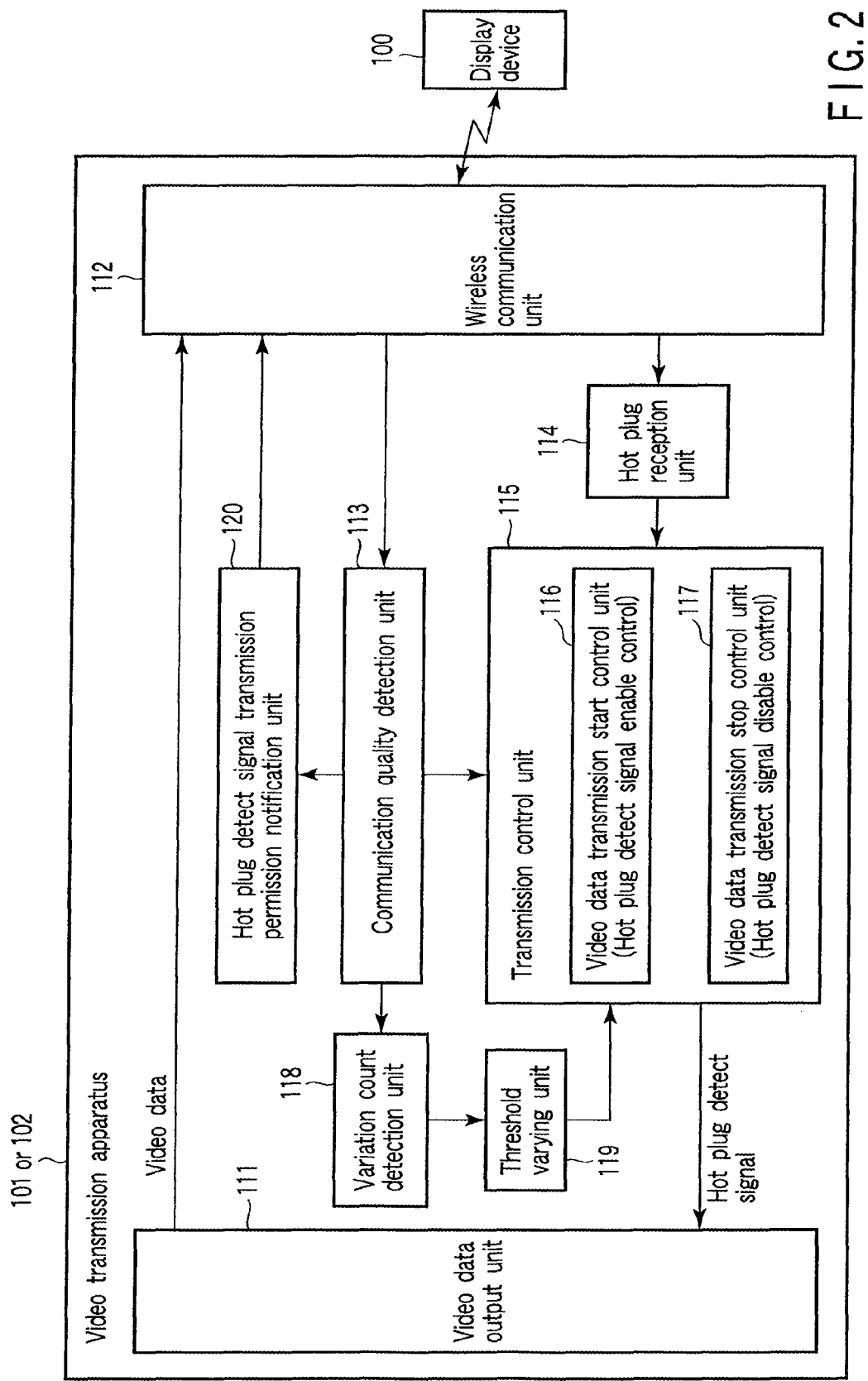
FIG. 2 is an exemplary block diagram showing a structure of the video transmission apparatus according to the embodiment.

FIG. 2 shows an example of the structure of the video transmission apparatus 101 or 102.

The video transmission apparatus 101 or 102 executes wireless communication with the display device 100 and transmits video data to the display device 100. The video transmission apparatus 101 or 102 includes a video data output unit 111, a wireless communication unit 112, a communication quality detection unit 113, a hot plug reception unit 114, a transmission control unit 115, a video data transmission start control unit 116, a video data transmission stop control unit 117, a variation count detection unit 118, a threshold varying unit 119, and a hot plug detect signal transmission permission notification unit 120.

The video data output unit 111 outputs video data (digital video data) which forms a screen image that is to be displayed on the display device 100. The output of the video data is started in response to the transition of the hot plug detect signal to an enable state. The hot plug detect signal in the enable state indicates that the display device 100 is in a state in which the display device 100 can display video data, and the hot plug detect signal in the disable state indicates that the display device 100 is not in the video data displayable state. The video data output unit 111 outputs video data in a case where the hot plug detect signal is in the enable state, and stops the output of video data in a case where the hot plug detect signal is in the disable state.

The wireless communication unit 112 executes wireless communication with the display device 100, and transmits video data, which is output from the video data output unit 111, to the display device 100 via a wireless communication channel between the display device 100 and the wireless communication unit 112. The wireless communication unit 112 is composed of, for example, a UWB wireless communication device which executes wireless communication by using UWB.

The communication quality detection unit 113 detects a communication quality level of the wireless communication channel between the display device 100 and the wireless communication unit 112. The communication quality level is an index which represents the degree of quality of the wireless environment of the wireless communication channel. For instance, a reception signal strength such as an RSSI (Received Signal Strength Indication) level, link quality, or a packet error rate may be used as the communication quality level.

The hot plug reception unit 114 receives the hot plug detect signal which is transmitted from the display device 100 via the wireless communication channel. After the display device 100 is wirelessly connected to the video transmission apparatus 101 or 102, the display device 100 transmits the hot plug detect signal, which indicates that the display device 100 can display video data, to the video transmission apparatus 101 or 102 via the wireless communication channel. In this case, specific control information (hot plug information) which belongs to a beacon, for example, is used as a signal for emulating the hot plug detect signal. After the display device 100 is wirelessly connected to the video transmission apparatus 101 or 102 and transitions into the video data displayable state, the display device 100 repeatedly transmits the hot plug information at predetermined time intervals.

The transmission control unit 115 controls transmission start and transmission stop of video data. The transmission control unit 115 can execute control of the transmission start and transmission stop of video data by enabling or disabling the hot plug detect signal which is input to the video data output unit 111. In order to prevent the occurrence of the phenomenon that the transmission start and transmission stop of video data are repeated due to instantaneous variation of the wireless connection environment, the transmission control unit 115 controls enabling/disabling of the hot plug detect signal by using two independent threshold values (first threshold value and second threshold value) relating to the communication quality level. The first threshold value is a communication quality level threshold value for enabling the hot plug detect signal. The second threshold value is a communication quality level threshold value for disabling the hot plug detect signal. In other words, the first threshold value is a threshold value which permits a change from the disable state to the enable state of the hot plug detect signal. Unless the current communication quality level exceeds the first threshold value, the change from the disable state to the enable state of the hot plug detect signal is not permitted. The second threshold value is a threshold value which permits a change from the enable state to the disable state of the hot plug detect signal. Unless the current communication quality level falls below the second threshold value, the change from the enable state to the disable state of the hot plug detect signal is not permitted.

A margin is provided between the first threshold value and the second threshold value, and the second threshold value is less than the first threshold value. The second threshold value may be set at a value corresponding approximately to a communication quality level at which degradation of a predetermined degree or more occurs in the image quality of video data.

By controlling the enabling/disabling of the hot plug detect signal with use of the first threshold value and second threshold value, the hot plug detect signal can be kept in the enable state or in the disable state, regardless of instantaneous variation of reception/non-reception of hot plug information from the display device 100, as long as the communication quality varies within the range corresponding to the margin. Thereby, it becomes possible to prevent the occurrence of the phenomenon that the transmission start and transmission stop of video data are repeated due to instantaneous variation of the wireless connection environment.

The transmission control unit 115 includes the video data transmission start control unit 116 and the video data transmission stop control unit 117.

The video data transmission start control unit 116 enables the hot plug detect signal, thereby executing control to start a process of transmitting video data to the display device 100 via the wireless communication channel.

In the case where the communication quality level that is detected by the communication quality detection unit 113 exceeds the first threshold value and the hot plug detect signal (hot plug information), which is transmitted from the display device 100 via the wireless communication channel and indicates that the display device 100 can display video data, is received by the hot plug reception unit 114 in the state in which transmission of video data to the display device 100 is stopped, that is, in the state in which the hot plug detect signal is in the disable state, the video data transmission start control unit 116 enables the hot plug detect signal that is input to the video data output unit 111, thereby starting the process of transmitting video data to the display device 100 via the wireless communication channel.

Specifically, in the case where transmission of video data to the display device 100 is stopped, the video data transmission start control unit 116 maintains the state in which the transmission of video data is stopped, that is, maintains the hot plug detect signal in the disable state until the detected communication quality level exceeds the first threshold value, regardless of the presence/absence of reception of the hot plug detect signal by the hot plug reception unit 114. When the condition is satisfied that the communication quality level that is detected by the communication quality detection unit 113 exceeds the first threshold value and the hot plug detect signal (hot plug information) that is transmitted from the display device 100 is received by the hot plug reception unit 114, the video data transmission start control unit 116 enables the hot plug detect signal that is input to the video data output unit 111, thereby starting the process of transmitting the video data to the display device 100 via the wireless communication channel.

The video data transmission stop control unit 117 disables the hot plug detect signal, thereby executing control to stop the process of transmitting video data to the display device 100 via the wireless communication channel.

In the case where the communication quality level that is detected by the communication quality detection unit 113 falls below the second threshold value in the state in which the process of transmitting video data to the display device 100 is being executed, that is, in the state in which the hot plug detect signal is in the enable state, the video data transmission stop control unit 117 disables the hot plug detect signal that is input to the video data output unit 111, thereby stopping the transmission of video data to the display device 100.

Specifically, in the case where the process of transmitting video data to the display device 100 is being executed, the video data transmission stop control unit 117 maintains the state in which the process of transmitting video data is executed, that is, maintains the hot plug detect signal in the enable state until the communication quality level that is detected by the communication quality detection unit 113 falls below the second threshold value, regardless of the presence/absence of reception of the hot plug detect signal (hot plug information) by the hot plug reception unit 114. When the condition is satisfied that the communication quality level that is detected by the communication quality detection unit 113 falls below the second threshold value, the video data transmission stop control unit 117 disables the hot plug detect signal, thereby stopping the process of transmitting the video data to the display device 100 via the wireless communication channel.

The variation count detection unit 118 and the threshold varying unit 119 are used in order to automatically adjust the margin between the first threshold value and the second threshold value in a case where the communication quality level sharply varies in a short time period. Specifically, the variation count detection unit 118 detects the number of times the communication quality level, which is detected by the communication quality detection unit 113, varies across both the first threshold value and second threshold value in a predetermined time period. If the detected number of times of variation exceeds a predetermined number, the threshold varying unit 119 selects one of the first threshold value and second threshold value, which is closer to a mean value of the communication quality level that is detected during the predetermined time period. If the first threshold value is selected, the first threshold value is increased. If the second threshold value is selected, the second threshold value is decreased. In the case where the first threshold value is selected, the threshold varying unit 119 sets the first threshold value, for example, at a maximum value of the communication quality level that is detected during the predetermined time period. In the case where the second threshold value is selected, the threshold varying unit 119 sets the second threshold value, for example, at a minimum value of the communication quality level that is detected during the predetermined time period.

The hot plug detect signal transmission permission notification unit 120 is an optional device which is provided, as needed, in the video transmission apparatus 101 or 102. The hot plug detect signal transmission permission notification unit 120 executes negotiation with the display device 100, and controls the transmission of the hot plug detect signal by the display device 100. Specifically, the hot plug detect signal transmission permission notification unit 120 transmits a signal, which instructs permission of transmission of the hot plug detect signal, to the display device 100 via the wireless communication channel in a case where the communication quality level that is detected by the communication quality detection unit 113 exceeds the first threshold value in the state in which the transmission of video data to the display device 100 is stopped, that is, in the state in which the hot plug detect signal that is input to the video data output unit 111 is disabled. Upon receiving the signal which instructs permission of transmission of the hot plug detect signal, the display device 100 starts the transmission of the hot plug detect signal (hot plug information).

With the provision of the hot plug detect signal transmission permission notification unit 120, the display device 100 can be made to stand by for transmission of the hot plug detect signal (hot plug information) until the wireless environment becomes good, in the state in which the transmission of video data to the display device 100 is stopped, that is, in the state in which the hot plug detect signal that is input to the video data output unit 111 is disabled.

Next, an example of the method of controlling the hot plug detect signal is described. In the description below, it is assumed that an RSSI value is used as an index which indicates the communication quality level.

Figure 3:
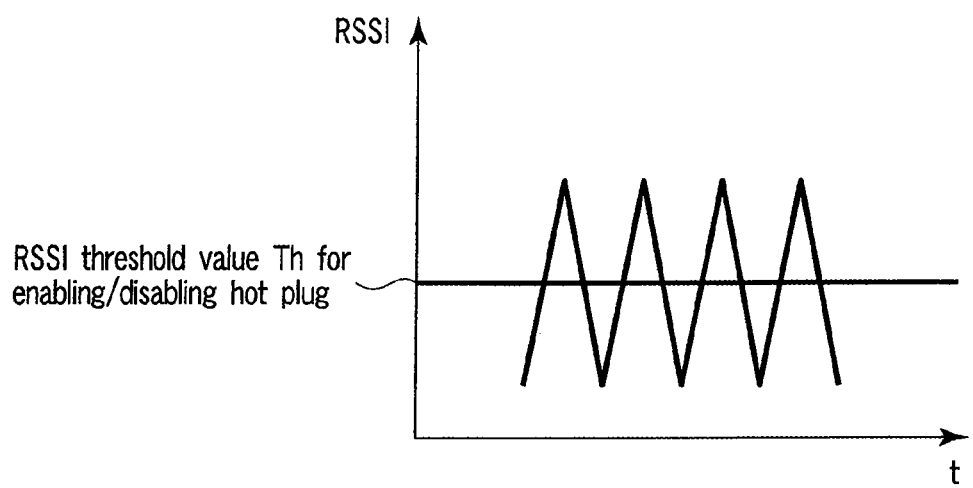
FIG. 3 is an exemplary graph showing the relationship between a variation of an RSSI value and a threshold value for enabling/disabling a hot plug detect signal.
Figure 4:
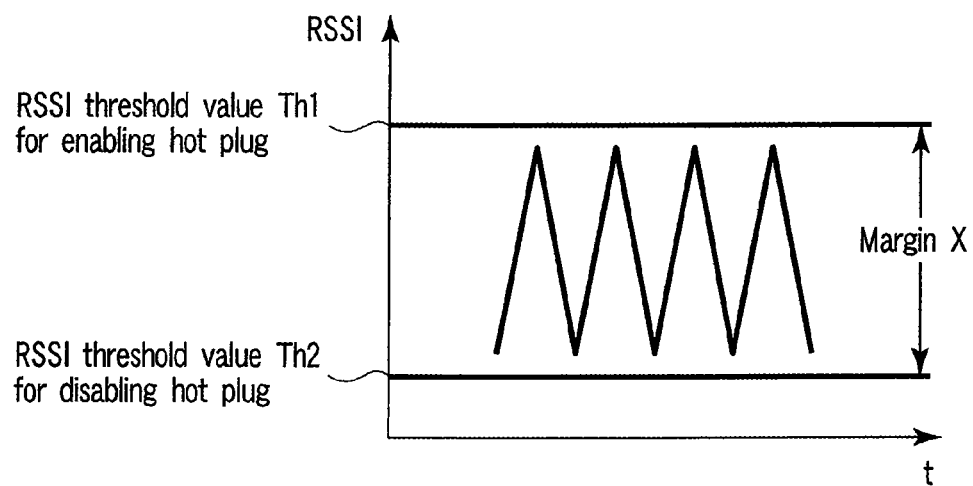
FIG. 4 is an exemplary graph for explaining a threshold value for enabling a hot plug detect signal and a threshold value for disabling the hot plug detect signal, which are used in the video transmission apparatus according to the embodiment.

FIG. 3 shows an example of control in a case where the enabling/disabling control of the hot plug detect signal is executed by using a single RSSI threshold value Th. FIG. 4 shows an example of control in a case where the enabling/disabling control of the hot plug detect signal is executed by using two RSSI threshold values Th1 and Th2. The RSSI threshold value Th1 is an RSSI threshold value for permitting enabling of the hot plug detect signal, and corresponds to the above-described first threshold value. The RSSI threshold value Th2 is an RSSI threshold value for disabling the hot plug detect signal, and corresponds to the above-described second threshold value.

In the example of control shown in FIG. 3, in the case where the RSSI value sharply varies in relation to time, the enabling of the hot plug detect signal and the disabling of the hot plug detect signal are repeated over and over again, since the number of RSSI threshold values is one. This leads to the above-described problem of flickering of the display screen of the display device 100. Also in the case where the RSSI threshold value is not used, the above-described problem of flickering of the display screen of the display device 100 will occur, because the hot plug detect signal reaches or fails to reach due to a sharp variation of the RSSI value.

However, as shown in FIG. 4, if the RSSI threshold value Th1 for enabling the hot plug detect signal and the RSSI threshold value Th2 for disabling the hot plug detect signal are independently provided, the variation of the RSSI value can be absorbed in the range between the two RSSI threshold values Th1 and Th2, and it becomes possible to prevent frequent repetition of the enabling of the hot plug detect signal and the disabling of the hot plug detect signal. As a result, the occurrence of flickering of the display screen of the display device 100 can be prevented. Specifically, the range corresponding to a margin X between the RSSI threshold value Th1 and RSSI threshold value Th2 functions as a kind of dead band. In the disable state of the hot plug detect signal, the hot plug detect signal can be kept in the disable state as long as the RSSI value does not exceed the RSSI threshold value Th1. Similarly, in the enable state of the hot plug detect signal, the hot plug detect signal can be kept in the enable state as long as the RSSI value does not fall below the RSSI threshold value Th2.

Figure 5:
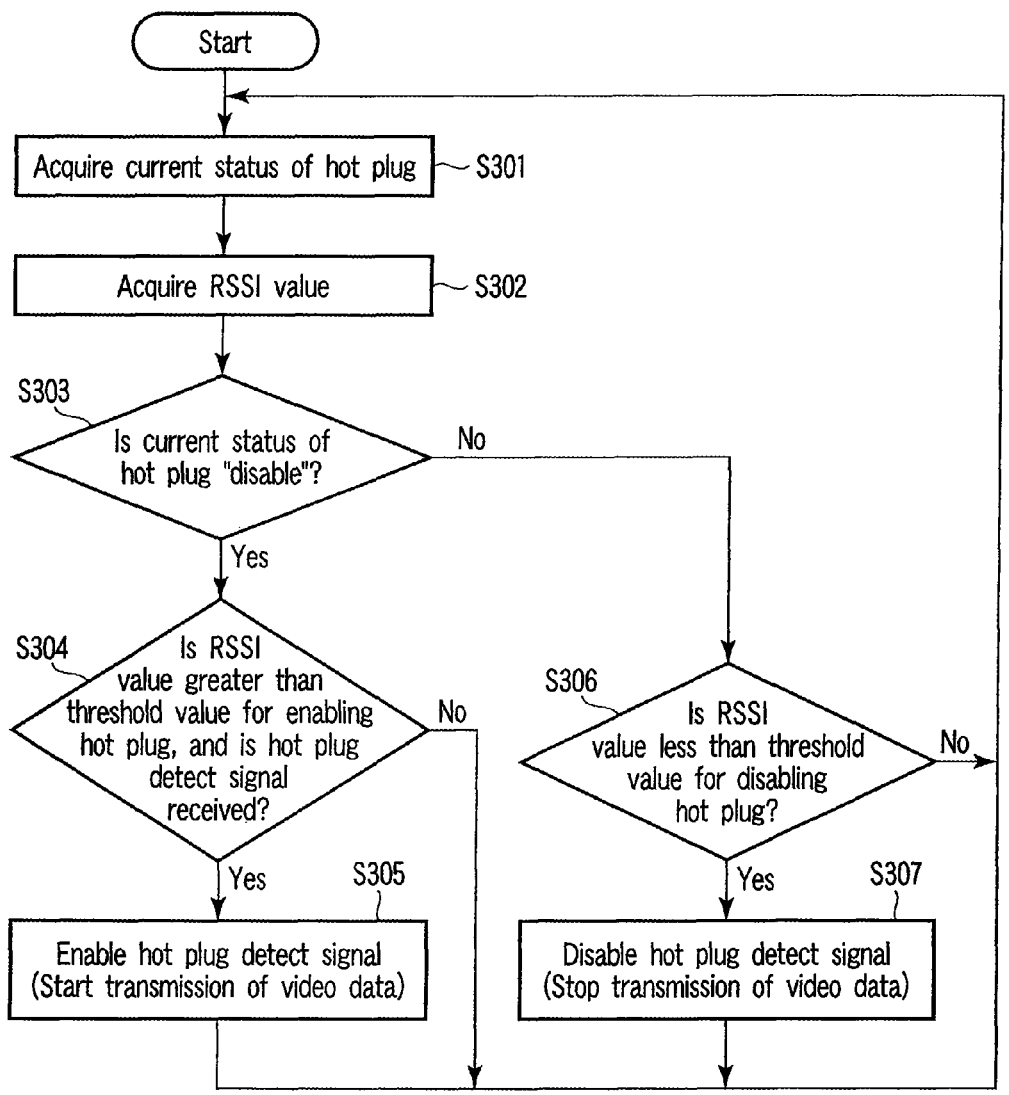
FIG. 5 is an exemplary flow chart illustrating the procedure of a hot plug detect signal control process which is executed by the video transmission apparatus according to the embodiment.

Next, referring to a flow chart of FIG. 5, a description is given of the procedure of a hot plug detect signal control process which is executed by the video transmission apparatus.

To start with, the video transmission apparatus acquires a current status of the hot plug detect signal that is input to the video data output unit 111 (step S301). Then, the video transmission apparatus acquires a current RSSI value from the communication quality detection unit 113 (step S302).

If the acquired status of the hot plug detect signal is "disable", that is, if the transmission of video data is stopped (YES in step S303), the video transmission apparatus determines whether such a hot plug detect signal enable condition is satisfied that the acquired current RSSI value is higher than the RSSI threshold value Th1 for enabling the hot plug detect signal and the hot plug detect signal (hot plug information) from the display device 100 is received by the hot plug reception unit 114 (step S304). If the hot plug detect signal enable condition is satisfied (YES in step S304), the video transmission apparatus sets the hot plug detect signal, which is input to the video data output unit 111, in the enable state, thereby to start the process of transmitting video data to the display device 100 via the wireless communication channel (step S305).

If the acquired status of the hot plug detect signal is "enable", that is, if the transmission of video data is executed (NO in step S303), the video transmission apparatus determines whether the acquired current RSSI value is lower than the RSSI threshold value Th2 for disabling the hot plug detect signal (step S306). If the acquired current RSSI value is lower than the RSSI threshold value Th2 for disabling the hot plug detect signal (YES in step S306), the video transmission apparatus sets the hot plug detect signal, which is input to the video data output unit 111, in the disable state, thereby to stop the process of transmitting video data to the display device 100 via the wireless communication channel (step S307).

Next, examples of the kinds of variation of the RSSI are described with reference to FIG. 6 to FIG. 10.

Figure 6:
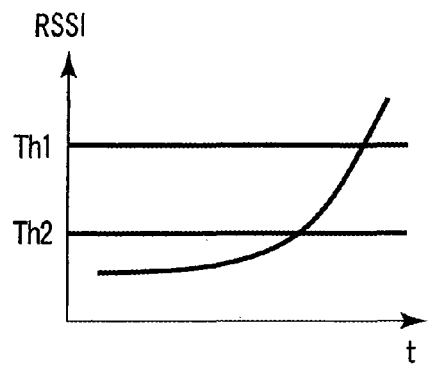
FIG. 6 is an exemplary graph showing the relationship between two threshold values and a first-type variation of the RSSI value, which are used in the video transmission apparatus according to the embodiment.

FIG. 6 shows a variation of the RSSI, which corresponds, for example, to a case in which the video transmission apparatus 101 or 102 is gradually moved toward the display device 100. In the case where the RSSI monotonously increases across the threshold value Th2 and threshold value Th1 in relation to time in this manner, the RSSI threshold value Th1 for enabling the hot plug detect signal is rendered effective and the hot plug detect signal is enabled.

Figure 7:
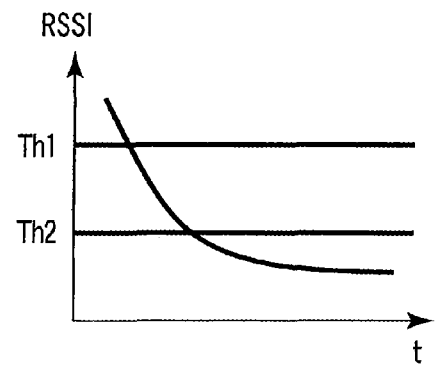
FIG. 7 is an exemplary graph showing the relationship between two threshold values and a second-type variation of the RSSI value, which are used in the video transmission apparatus according to the embodiment.

FIG. 7 shows a variation of the RSSI, which corresponds, for example, to a case in which the video transmission apparatus 101 or 102 is gradually moved away from the display device 100. In the case where the RSSI monotonously decreases across the threshold value Th1 and threshold value Th2 in relation to time in this manner, the RSSI threshold value Th2 for disabling the hot plug detect signal is rendered effective and the hot plug detect signal is disabled.

Figure 8:
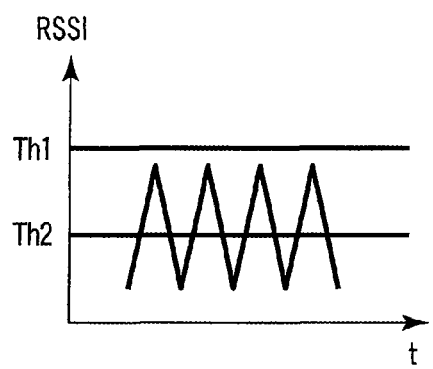
FIG. 8 is an exemplary graph showing the relationship between two threshold values and a third-type variation of the RSSI value, which are used in the video transmission apparatus according to the embodiment.

FIG. 8 shows a case in which the RSSI sharply varies per unit time due to disturbances such as interference and the RSSI varies across only the RSSI threshold value Th2 for disabling the hot plug detect signal. At this time, once the hot plug detect signal is disabled, no control is subsequently executed with respect to the hot plug detect signal. In other words, after the hot plug detect signal is once disabled, the hot plug detect signal is kept in the disable state regardless of the presence/absence of reception of the hot plug detect signal (hot plug information) that is sent from the display device 100.

Figure 9:
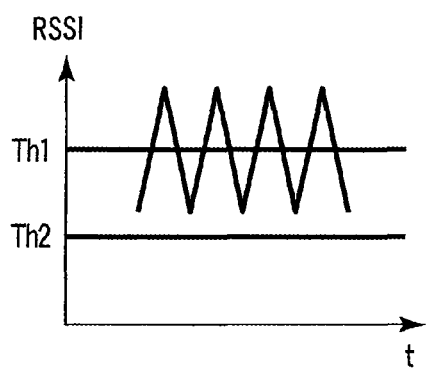
FIG. 9 is an exemplary graph showing the relationship between two threshold values and a fourth-type variation of the RSSI value, which are used in the video transmission apparatus according to the embodiment.

FIG. 9 shows a case in which the RSSI sharply varies per unit time due to disturbances such as interference and the RSSI varies across only the RSSI threshold value Th1 for enabling the hot plug detect signal. At this time, once the hot plug detect signal is enabled, no control is subsequently executed with respect to the hot plug detect signal. In other words, after the hot plug detect signal is once enabled, the hot plug detect signal is kept in the enable state regardless of the presence/absence of reception of the hot plug detect signal (hot plug information) that is sent from the display device 100.

In the cases shown in FIG. 6 to FIG. 9, stable control can be executed without repetition of enabling/disabling of the hot plug detect signal in relation to the variation of the RSSI.

Figure 10:
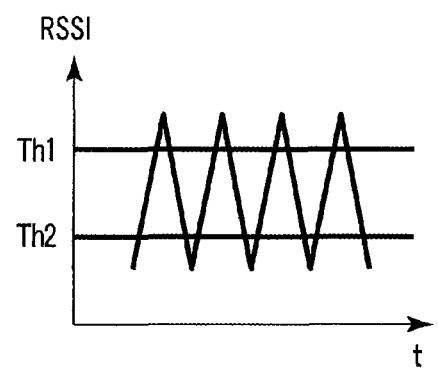
FIG. 10 is an exemplary graph showing the relationship between two threshold values and a fifth-type variation of the RSSI value, which are used in the video transmission apparatus according to the embodiment.

FIG. 10 shows a case in which the RSSI sharply varies per unit time due to disturbances such as interference and the RSSI varies across both the RSSI threshold value Th1 for enabling the hot plug detect signal and the RSSI threshold value Th2 for disabling the hot plug detect signal. In this case, since the RSSI varies beyond the margin X between the threshold values shown in FIG. 4, the enabling/disabling of the hot plug detect signal is repeated, and consequently the transmission/stop of video data is repeated.

The situation shown in FIG. 10 can be avoided by dynamically varying the margin X between the threshold values. The process of dynamically varying the margin X is executed by the above-described variation count detection unit 118 and threshold varying unit 119.

Figure 11:
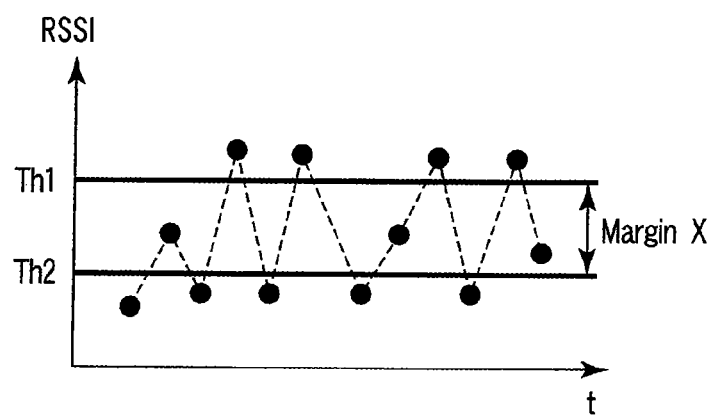
FIG. 11 is a first graph for explaining an inter-threshold margin control process which is executed by the video transmission apparatus according to the embodiment.
Figure 12:
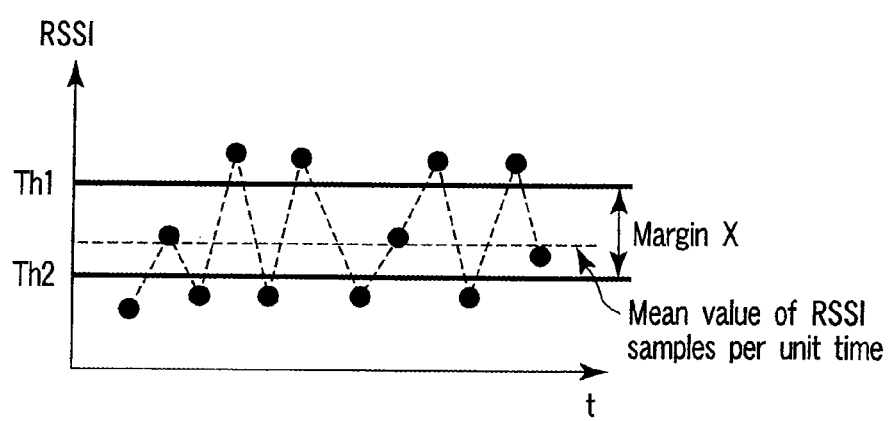
FIG. 12 is a second graph for explaining the inter-threshold margin control process which is executed by the video transmission apparatus according to the embodiment.
Figure 13:
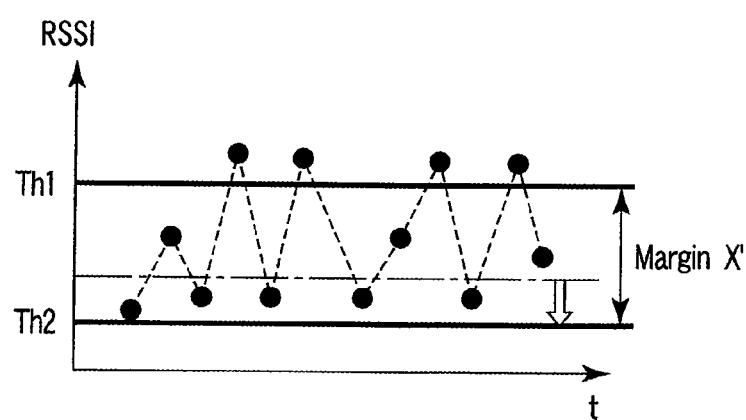
FIG. 13 is a third graph for explaining the inter-threshold margin control process which is executed by the video transmission apparatus according to the embodiment.

Next, referring to FIG. 11 to FIG. 13, a description is given of examples of the method of controlling the margin between the RSSI threshold values.

When the RSSI has varied, as shown in FIG. 11, the video transmission apparatus acquires a plurality of RSSI samples in a predetermined time period, and detects the number of times of variation, that the RSSI value varies across both the threshold values Th1 and Th2 in a predetermined time period. Specifically, the video transmission apparatus counts how many RSSI samples are above the threshold value Th1 for enabling the hot plug detect signal and how many RSSI samples are below the threshold value Th2 for disabling the hot plug detect signal within the predetermined time period, and calculates how may times the enabling/disabling of the hot plug detect signal is repeated. If the number of times of repeated enabling/disabling is a predetermined value or more, the video transmission apparatus adjusts the inter-threshold margin X in order to suppress the repetition of enabling/disabling. In the example shown in FIG. 11, twelve RSSI samples are taken per unit time. The RSSI exceeds four times the RSSI threshold value Th1 for enabling the hot plug detect signal, and falls five times below the RSSI threshold value Th2 for disabling the hot plug detect signal. As a result, the enabling/disabling of the hot plug detect signal is repeated seven times. If the reference number of times of repetition of enabling/disabling is 4, the number of times in this example is greater than the reference number and it is necessary to adjust the inter-threshold margin X.

The video transmission apparatus calculates a mean value of plural RSSI samples per unit time in FIG. 11. FIG. 12 shows a mean value of RSSI samples. In FIG. 12 a broken line indicates a mean value. The video transmission apparatus then compares the mean value and each of the RSSI threshold values Th1 and Th2, and varies one of the RSSI threshold values Th1 and Th2, which has a less difference from the mean value, so that enabling/disabling of the hot plug detect signal may not occur. Specifically, the video transmission apparatus compares the mean value calculated in FIG. 12 and each of the RSSI threshold values Th1 and Th2 for controlling the hot plug detect signal, and selects one of the RSSI threshold values Th1 and Th2, which is closer to the mean value. If the selected threshold value is the RSSI threshold value Th1 for enabling the hot plug detect signal, the video transmission apparatus increases the RSSI threshold value Th1. In this case, the threshold value Th1 should better be set at a maximum value of the RSSI samples that are acquired in the predetermined time period. On the other hand, if the selected threshold value is the RSSI threshold value Th2 for disabling the hot plug detect signal, the video transmission apparatus decreases the RSSI threshold value Th2. In this case, the threshold value Th2 should better be set at a minimum value of the RSSI samples that are acquired in the predetermined time period.

Figure 14:
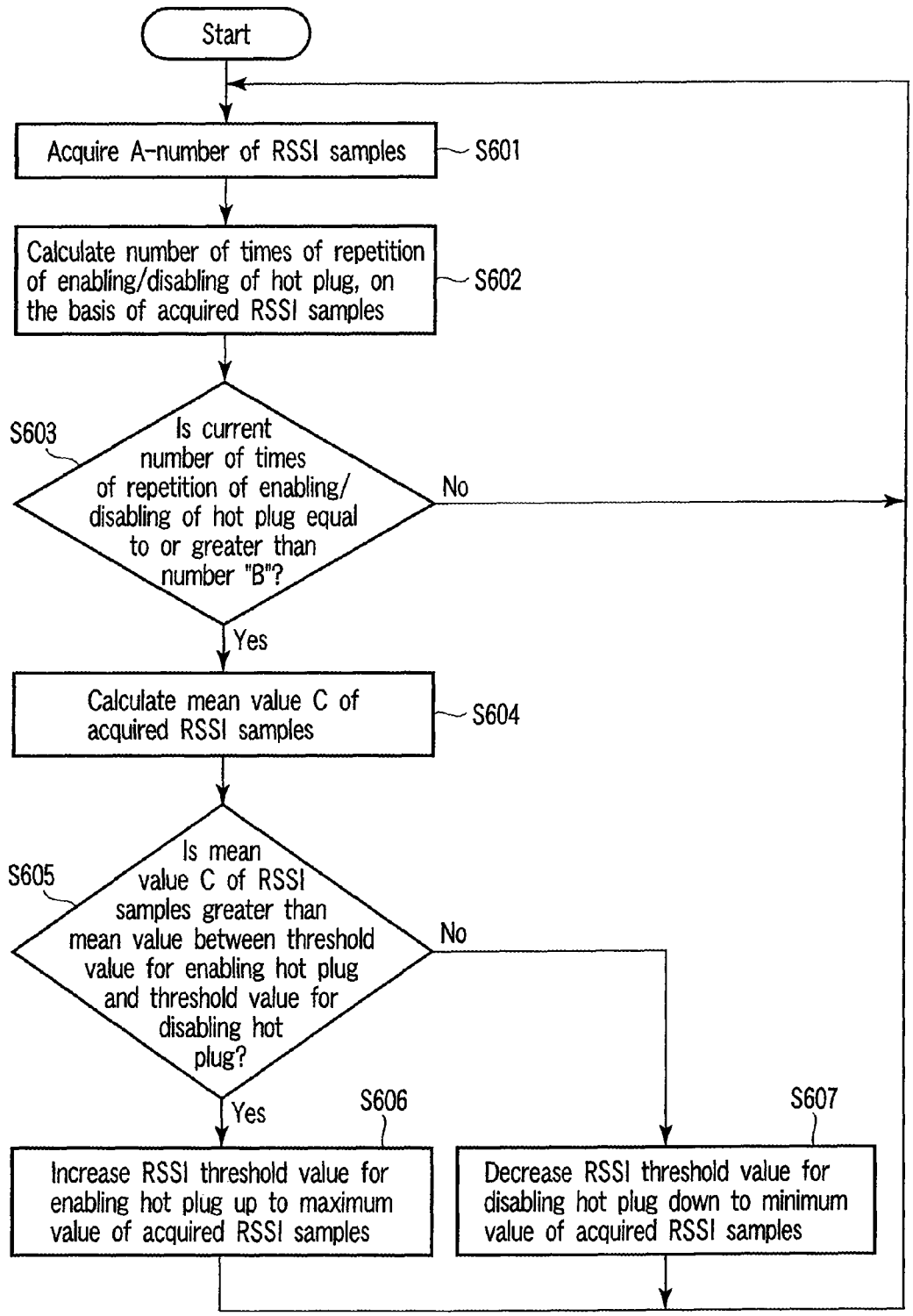
FIG. 14 is an exemplary flow chart illustrating the procedure of the inter-threshold margin control process which is executed by the video transmission apparatus according to the embodiment.

Next, referring to a flow chart of FIG. 14, a description is given of the process for controlling the margin between the RSSI threshold values.

To start with, the video transmission apparatus acquires a plurality of RSSI samples (an A-number of RSSI samples) in a predetermined time period (step S601). Then, based on the acquired RSSI samples, the video transmission apparatus calculates the number of times of repetition of enabling/disabling of the hot plug detect signal, that is, how many times the RSSI value has varied across both the threshold values Th1 ad Th2 in a predetermined time period (step S602).

If the number of times of repetition of enabling/disabling of the hot plug detect signal, that is, the number of times the RSSI value has varied across both the threshold values Th1 ad Th2 in a predetermined time period, is less than a predetermined number of times (a B-number of times) (NO in step S603), the video transmission apparatus returns to step S601 and acquires RSSI samples once again (after a predetermined time period).

On the other hand, if the number of times of repetition of enabling/disabling of the hot plug detect signal, that is, the number of times the RSSI value has varied across both the threshold values Th1 ad Th2 in a predetermined time period, is greater than the B-number of times (YES in step S603), the video transmission apparatus calculates a mean value C of the acquired RSSI samples (step S604). The video transmission apparatus then compares the mean value C and a mean value between the threshold values Th1 and Th2, and determines whether the mean value C is greater than the mean value between the threshold values Th1 and Th2 (step S605).

If the mean value C is greater than the mean value between the threshold values Th1 and Th2 (YES in step S605), that is, if the threshold value that is closer to the mean value C is the threshold value Th1 (YES in step S605), the video transmission apparatus increases the threshold value Th1 up to the maximum value of the acquired A-number of RSSI samples (step S606).

If the mean value C is less than the mean value between the threshold values Th1 and Th2 (NO in step S605), that is, if the threshold value that is closer to the mean value C is the threshold value Th2 (NO in step S605), the video transmission apparatus decreases the threshold value Th2 down to the minimum value of the acquired A-number of RSSI samples (step S607).

The process shown in FIG. 14 is repeatedly executed, for example, at predetermined time intervals. Thereby, the margin between the RSSI threshold values for controlling the hot plug detect signal can properly be adjusted.

In order to avoid the influence of spike-like variations of RSSI values, mean values of some RSSI values may be used as the above-described RSSI values and RSSI sample values. In the above-described embodiment, the RSSI is used as an index representative of the wireless environment. Alternatively, other indices representative of the wireless environment, such as a packet error rate or link quality, may be used.

As has been described above, in the present embodiment, the RSSI threshold value for enabling the hot plug detect signal and the RSSI threshold value for disabling the hot plug detect signal are independently provided, and the margin between the threshold values is dynamically varied. Thereby, it is possible to solve the problem that the hot plug detect signal is repeatedly enabled and disabled depending on the wireless connection state. Therefore, it is possible to avoid, as much as possible, such an unpleasant phenomenon for a user that the transmission of video data is repeatedly started and stopped and the screen image of the display device 100 flickers.

In the above description, the RSSI value is used as the communication quality level. However, the communication quality level is not limited to the RSSI value, and a link quality level or a packet error rate may be used as the communication quality level. For example, in the case where the link quality level is used as the communication quality level, a first link quality level threshold value is used as the first threshold value for enabling the hot plug detect signal, and a second link quality level threshold value, which is lower than the first link quality level threshold value, is used as the second threshold value for disabling the hot plug detect signal.

Figure 15:
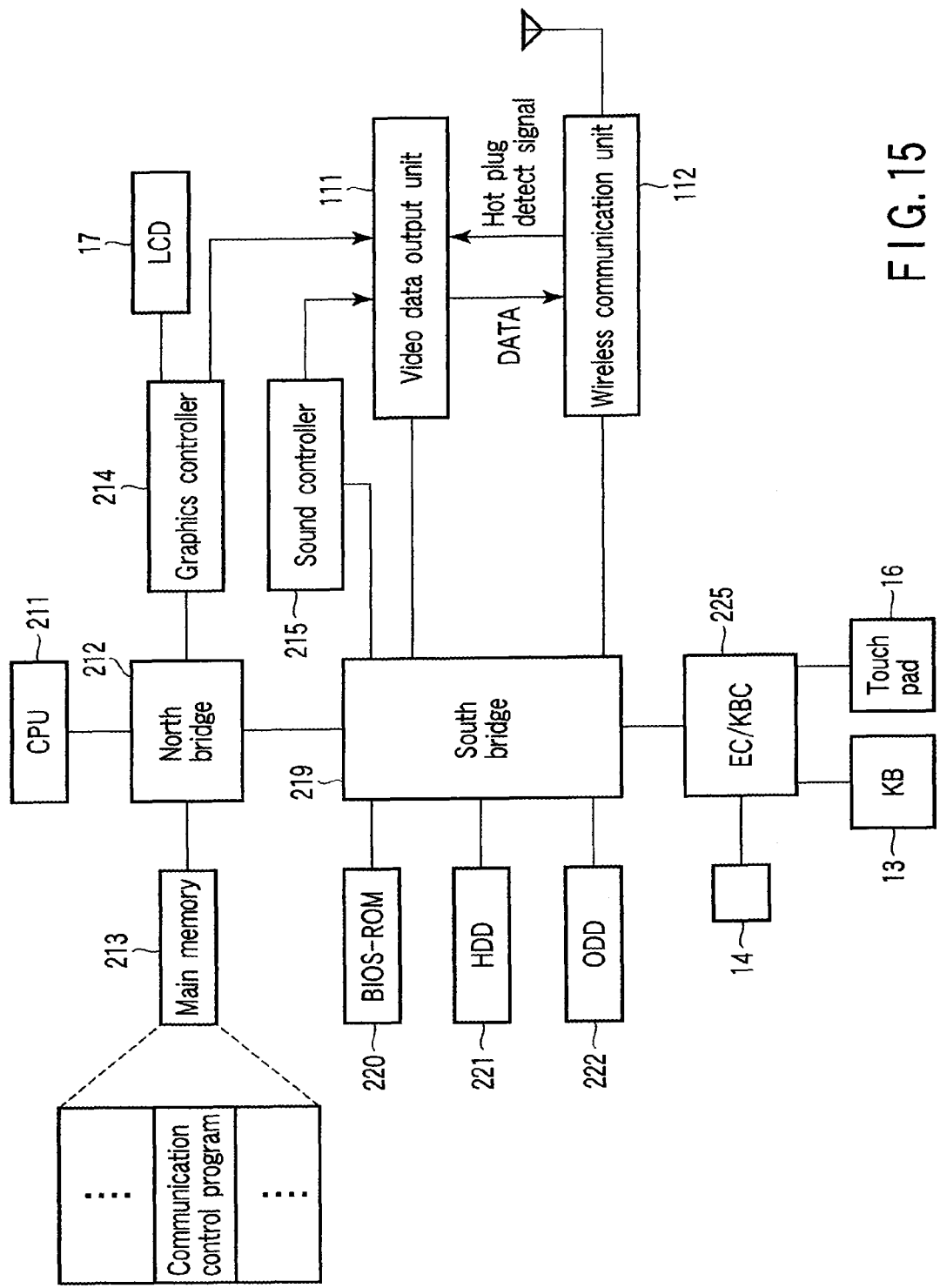
FIG. 15 is an exemplary block diagram showing the structure of the video transmission apparatus according to the embodiment in a case where the video transmission apparatus is realized as a personal computer.

Next, referring to FIG. 15, a description is given of an example of the hardware configuration of the video transmission apparatus according to the embodiment in a case where the video transmission apparatus is realized by the PC 101.

The PC 101 includes, in addition to the above-described video data output unit 111 and wireless communication unit 112, a CPU 211, a north bridge 212, a main memory 213, a graphics controller 214, a sound controller 215, a south bridge 219, a BIOS-ROM 220, a hard disk drive (HDD) 221, an optical disc drive (ODD) 222, and an embedded controller/keyboard controller IC (EC/KBC) 225.

The CPU 211 is a processor that controls the operation of the PC 101. The CPU 211 executes an operating system (OS) and various application/utility programs, which are loaded from the hard disk drive (HDD) 221 into the main memory 113. The application/utility programs include a communication control program. The communication control program is a program for controlling the wireless communication unit 112.

The CPU 211 also executes a BIOS (Basic Input/Output System) that is stored in the BIOS-ROM 220. The BIOS is a program for hardware control.

The north bridge 212 is a bridge device that connects a local bus of the CPU 211 and the south bridge 219. In addition, the north bridge 212 has a function of executing communication with the graphics controller 214.

The graphics controller 214 is a display controller which controls an LCD (Liquid Crystal Display) 17 that is used as a display monitor of the PC 101. A video signal which is generated by the graphics controller 214 is sent to the LCD 17. In addition, the graphics controller 214 can send a digital video signal to the video data output unit 111.

The south bridge 219 is a bridge device which controls various I/O devices. The video data output unit 111 and wireless communication unit 112 are connected to the south bridge 219. The embedded controller/keyboard controller IC (EC/KBC) 225 is a 1-chip microcomputer in which an embedded controller for power management and a keyboard controller for controlling a keyboard (KB) 13 and a touch pad 16 are integrated.

The video data output unit 111 converts the video signal, which is output from the graphics controller 214, to transmission data DATA of a predetermined format, and sends the transmission data DATA to the wireless communication unit 112. In the process of conversion to transmission data DATA, the video signal, which is output from the graphics controller 214, may be subjected to a compression encoding process, as needed. The video data output unit 111 can also send an audio signal, which is output from the sound controller 215, to the wireless communication unit 112 as transmission data DATA.

For example, the functions of the communication quality detection unit 113, hot plug reception unit 114, transmission control unit 115, variation count detection unit 118, threshold varying unit 119 and hot plug detect signal transmission permission notification unit 120, which have been described with reference to FIG. 2, may be realized by the communication control program that is executed by the CPU 211. In this case, the process described with reference to the flow chart of FIG. 5 and the process described with reference to the flow chart of FIG. 14 may be executed by the CPU 211. Needless to say, the functions of the communication quality detection unit 113, hot plug reception unit 114, transmission control unit 115, variation count detection unit 118, threshold varying unit 119 and hot plug detect signal transmission permission notification unit 120, which have been described with reference to FIG. 2, may be realized by dedicated purpose-specific circuits, or these functions may be realized by a microprocessor, a DSP, etc.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video transmission apparatus which executes wireless communication with a display device to transmit video data to the display device, comprising:
 a communication quality detection unit configured to detect a communication quality level of a wireless communication channel which wirelessly connects the display device and the video transmission apparatus; and a control unit configured to control a transmission start and a transmission stop of the video data using first and second threshold values relating to the communication quality level, the first threshold value being used for permitting the transmission start, the second threshold value being used for permitting the transmission stop, the second threshold value being lower than the first threshold value, wherein the control unit comprises:

a start control unit configured to start a process of transmitting the video data to the display device via the wireless communication channel if the detected communication quality level exceeds the first threshold value and a hot plug detect signal, which is transmitted from the display device via the wireless communication channel, is received while transmission of the video data to the display device is stopped, the hot plug detect signal indicating that the display device is able to display the video data, and a stop control unit configured to stop the transmission of the video data to the display device if the detected communication quality level falls below the second threshold value while the process of transmitting the video data to the display device is being executed.

2. The video transmission apparatus according to claim 1, further comprising:

a variation count detection unit configured to detect the number of times the detected communication quality level varies across both the first threshold value and the second threshold value in a predetermined time period; and a threshold varying unit which executes, if the detected number of times exceeds a predetermined number, one of a process of varying the first threshold value to a greater value and a process of varying the second threshold value to a lesser value.

3. The video transmission apparatus according to claim 2, wherein the threshold varying unit selects one of the first threshold value and the second threshold value, which is closer to a mean value of the communication quality level which is detected during the predetermined time period, increases the first threshold value if the first threshold value is selected, and decreases the second threshold value if the second threshold value is selected.

4. The video transmission apparatus according to claim 3, wherein the threshold varying unit sets the first threshold value at a maximum value of the communication quality level, which is detected during the predetermined time period, if the first threshold value is selected, and sets the second threshold value at a minimum value of the communication quality level, which is detected during the predetermined time period, if the second threshold value is selected.

5. The video transmission apparatus according to claim 1, wherein if the transmission of the video data to the display device is stopped, the start control unit maintains a state in which the transmission of the video data is stopped, until the detected communication quality level exceeds the first threshold value, regardless of presence/absence of reception of the hot plug detect signal.

6. The video transmission apparatus according to claim 1, wherein if the process of transmitting the video data to the display device is being executed, the stop control unit maintains the execution of the process of transmitting the video data, until the detected communication quality level falls below the second threshold value, regardless of presence/absence of reception of the hot plug detect signal.

7. The video transmission apparatus according to claim 1, further comprising a notification unit configured to transmit a signal, which instructs permission of transmission of the hot plug detect signal, to the display device via the wireless communication channel if the detected communication quality level exceeds the first threshold value while the transmission of the video data to the display device is stopped.

8. The video transmission apparatus according to claim 1, further comprising:

a video data output unit configured to output video data if the hot plug detect signal is in an enable state, and stop the output of the video data if the hot plug detect signal is in a disable state; and a wireless communication unit which executes wireless communication with the display device, and transmits the video data, which is output from the video data output unit, to the display device via a wireless communication channel between the display device and the wireless communication unit, wherein the start control unit sets the hot plug detect signal in the enable state, thereby to start a process of transmitting the video data to the display device via the wireless communication channel, if the detected communication quality level exceeds the first threshold value and the hot plug detect signal, which is transmitted from the display device, is received while the hot plug detect signal is kept in the disable state, and the stop control unit sets the hot plug detect signal in the disable state, thereby to stop the transmission of the video data to the display device, if the detected communication quality level falls below the second threshold value while the hot plug detect signal is kept in the enable state.

9. A video data transmission apparatus comprising:

a video data output unit configured to output video data if a hot plug detect signal, which indicates that a display device is able to display the video data, is in an enable state, and stop the output of the video data if the hot plug detect signal is in a disable state;

a wireless communication unit which executes wireless communication with the display device, and transmits the video data, which is output from the video data output unit, to the display device via a wireless communication channel between the display device and the wireless communication unit;

a communication quality detection unit configured to detect a communication quality level of the wireless communication channel;

a reception unit configured to receive hot plug information which is transmitted from the display device via the wireless communication channel and indicates that the display device is able to display the video data; and a control unit configured to control enabling and disabling of the hot plug detect signal using first and second threshold values relating to the communication quality level, the first threshold value being used for enabling the hot plug detect signal, the second threshold value being used for disabling the hot plug detect signal, the second threshold value being lower than the first threshold value, wherein the control unit comprises:

an enable control unit configured to execute a process of maintaining, if the hot plug detect signal is set in the disable state, the hot plug detect signal in the disable state until the detected communication quality level exceeds the first threshold value, regardless of presence/absence of reception of the hot plug information, and setting the hot plug detect signal in the enable state if a condition is satisfied that the detected communication quality level exceeds the first threshold value and the hot plug information is received, and a disable control unit configured to execute a process of maintaining, if the hot plug detect signal is set in the enable state, the hot plug detect signal in the enable state until the detected communication quality level falls below the second threshold value, regardless of presence/absence of reception of the hot plug information, and setting the hot plug detect signal in the disable state if a condition is satisfied that the detected communication quality level falls below the second threshold value while the hot plug detect signal is set in the enable state.

10. A video transmission method of transmitting video data from a video transmission apparatus to a display device via a wireless communication channel which wirelessly connects the video transmission apparatus and the display device, comprising:

detecting a communication quality level of the wireless communication channel; and controlling a transmission start and a transmission stop of the video data using first and second threshold values relating to the communication quality level, the first threshold value being used for permitting the transmission start, the second threshold value being used for permitting the transmission stop, the second threshold value being lower than the first threshold value, wherein the controlling comprises:

starting a process of transmitting the video data to the display device via the wireless communication channel, if the detected communication quality level exceeds the first threshold value and a hot plug detect signal, which is transmitted from the display device via the wireless communication channel and indicates that the display device is connected to the video transmission apparatus and is able to display the video data, is received while transmission of the video data to the display device is stopped, and stopping the transmission of the video data to the display device if the detected communication quality level falls below the second threshold value, while the process of transmitting the video data to the display device is being executed.

11. The video transmission method according to claim 10, further comprising:

detecting the number of times the detected communication quality level varies across both the first threshold value and the second threshold value in a predetermined time period;

selecting one of the first threshold value and the second threshold value, which is closer to a mean value of the communication quality level which is detected during the predetermined time period, if the detected number of times exceeds a predetermined number; and performing a threshold varying process to increase the first threshold value if the first threshold value is selected, and to decrease the second threshold value if the second threshold value is selected.

12. The video transmission method according to claim 11, wherein said threshold varying process includes a process of setting the first threshold value at a maximum value of the communication quality level, which is detected during the predetermined time period, if the first threshold value is selected, and a process of setting the second threshold value at a minimum value of the communication quality level, which is detected during the predetermined time period, if the second threshold value is selected.

* * * * *